United States Patent [19]

Chirichigno

[11] 4,309,822

[45] Jan. 12, 1982

[54] CABLE COVER SLITTING TOOL

[76] Inventor: Jerry Chirichigno, 1306 S. Jay St., Lakewood, Colo. 80215

[21] Appl. No.: 89,166

[22] Filed: Oct. 29, 1979

Related U.S. Application Data

[63] Continuation-in-part of Ser. No. 9,763, Feb. 6, 1979.

[51] Int. Cl.³ ................. B21F 13/00; B26B 27/00
[52] U.S. Cl. ........................................ 30/90.9
[58] Field of Search .................................. 30/90.9

[56] References Cited

U.S. PATENT DOCUMENTS 2,591,560  4/1952  LaVoie ................. 30/90.9
3,600,805  8/1971  Stuckel ................. 30/90.9

FOREIGN PATENT DOCUMENTS 64149  9/1949  Netherlands ............ 30/90.9

*Primary Examiner*—Stephen G. Kunin
*Assistant Examiner*—J. T. Zatarga
*Attorney, Agent, or Firm*—Bruce G. Klaas; Dennis K. Shelton

[57] ABSTRACT

A short tubular passage accommodating an electric cable, a slitter blade positioned in a portion of the passage, a cable release guide from the passage and a pistol grip handle secured to the release guide.

2 Claims, 7 Drawing Figures

CABLE COVER SLITTING TOOL

CROSS REFERENCE TO RELATED APPLICATIONS

This application is a continuation-in-part of applicant's copending application Ser. No. 9,763 filed Feb. 6, 1979.

BACKGROUND OF THE INVENTION

This invention relates to a cutter for slitting the covering on an electric cable exposing the conducting wires preparatory to connecting the wires to terminals.

Electrically conducting wires are normally covered with an insulating cover, and a number of the individual covered wires, usually with some spacing material, are formed into a cable and covered with an outer covering. Such cables are formed in very long strands which are rolled on reels for shipments. A particular use of the cable may use only a short portion of the cable on a reel, providing a cable having two ends covered and insulated to the end cut. For many electric connections with a terminal, the conducting wires must be bared. This involves slitting the outer covering, and then slitting the covering on the individual wires. The outer covering is tough and sturdy and difficult to slit, while the wire coverings are easier to cut. Electricians may have to "peel" the ends of a cable many times in a day, and a pocket knife, commonly used, is tedious and not entirely satisfactory. This is particularly true with a protruding end of the cable which has been threaded through a junction or terminal box. The protruding cable covering is usually slit to the box wall so as to free the wires inside the box. The cable covering requires a long slit to seal it for exposing relatively long lengths of wire. The wire covering is peeled only enough to make a connection.

Several prior art devices are known for use in slitting cables. For example, U.S. Pat. No. 1,739,972 discloses a device having a curved channel of generally semicylindrical cross section wherein a fixedly mounted knife blade protrudes into the channel at the curved portion thereof. In U.S. Pat. No. 3,620,104, the cable is moved through a tool having a cylindrical body against two cutting edges of unequal length. U.S. Pat. No. 1,165,176 describes a wire stripping tool having a blade which is adjustable for different size wires and which acts as a roller rotatable in a fixed position. Other cable stripping tools are disclosed in U.S. Pat. Nos. 2,691,822, 2,819,520 and 1,885,944.

SUMMARY OF THE INVENTION

The present invention provides a partially open tubular device for accepting an electric cable telescoped therein, with a knife adjacent the tubular inlet to the device in a knife holder section in position to slit the cover of the telescoped cable adjacent the inlet. The device includes a cable guiding and release section at a tubular open portion which forces the cable end upwardly after passing through the knife holder section, and a manipulating handle for tilting the unit and pulling the slitting knife along the cable. A reciprocably slidable roller in the cutter section permits the slitting of variously sized cables. The unit is preferably made as a one piece molded plastic tool which is inexpensive enough to be a throw away item.

OBJECTS AND ADVANTAGES OF THE INVENTION

Included among the objects and advantages of the invention is to provide an inexpensive, throw away slitting tool for electric cables.

Another object of the invention is to provide a simple, easily used slitting tool for slitting of the covering of an electric cable.

Another object of the invention is to provide a slitting tool which is automatically adjustable to slit differently sized cables.

Still another object of the invention is to provide a one piece molded slitting knife holder for slitting the cover of an electric cable.

These and other objects and advantages of the invention may be ascertained by reference to the following description and appended drawings.

DETAILED DESCRIPTION

Figure 2:
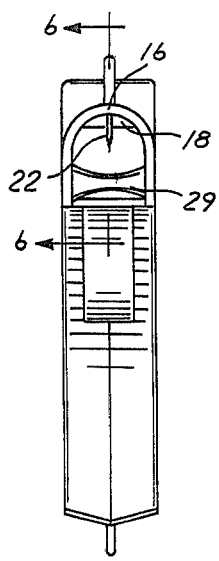
FIG. 2 is a front elevational view of the tool of FIG. 1.
Figures 1, 7:
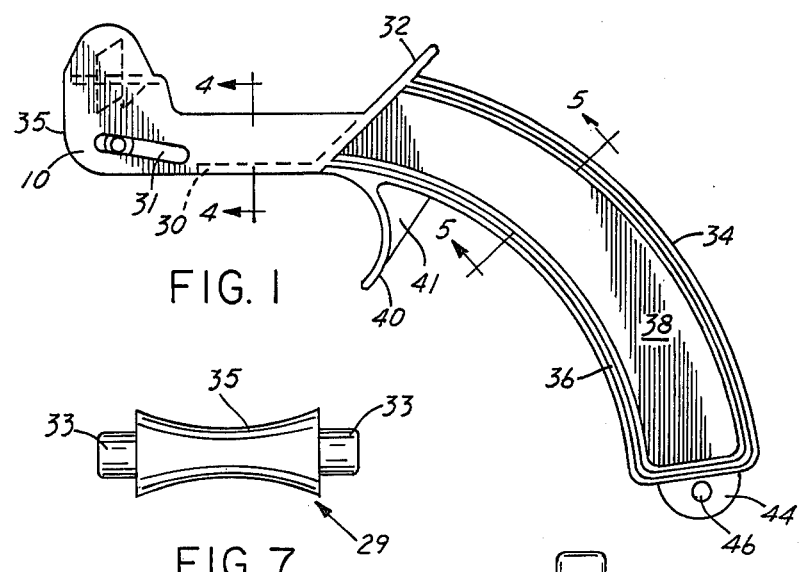
FIG. 1 is a side elevational view of an electric cable splitter tool according to the invention.
FIG. 7 is a detailed end view of a roller member of the tool of FIG. 1.
Figure 3:
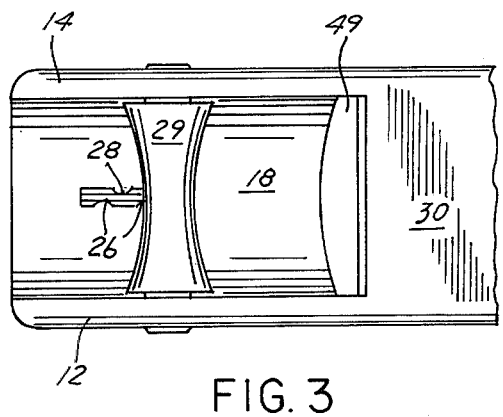
FIG. 3 is a detailed bottom view of the knife holder section of the tool of the invention.
Figure 4:
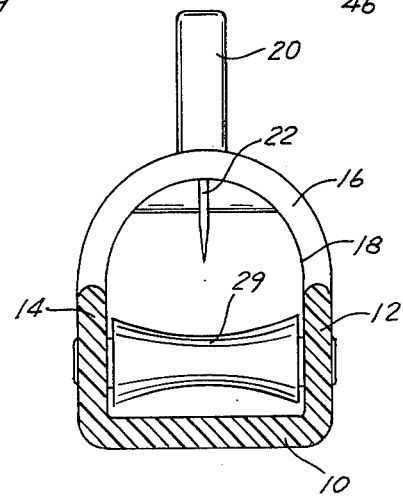
FIG. 4 is a detailed cross-sectional view of the cable guiding section of the tool of FIG. 1 taken on section line 4—4.
Figure 5:
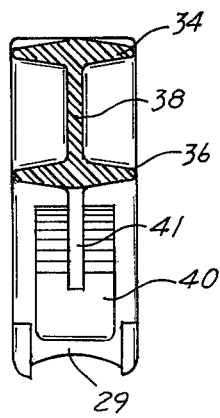
FIG. 5 is a detailed cross-section of the handle section of the tool of FIG. 1 taken on section line 5—5.

The tool of FIG. 1 includes a knife holder section, a cable guiding and release section, and a handle section. The knife holder section includes an inverted U body 10, having side walls 12 and 14, and an arcuate or vaulted top wall 16. The top wall has an arcuate lower surface 18, and an outwardly extending projection 20, FIG. 4, containing a pointed knife blade 22 extending through an opening 24. The knife opening 24 has a pair of spaced projections 26 on one side (FIG. 3) and a projection 28 on the other side centered on the two projections 26. The knife blade 22 extends diametrically into the knife holder section, about one third of the diameter of the knife holder section. The opening and the projections are formed in the molded part so that a knife blade must be forced between the projections, which tightly secure the blade in the tool. The knife blade may be made with two points and two cutting edges so that it is reversible, and may be changed using long nose pliers, for example. The sharp edge 23 should face the bottom of the cable inlet so as to be in position to cut the covering of the cable at a point along a radial line from the central axis of the cable as the tool is withdrawn from a telescoped cable. The point of the knife projects forwardly and downwardly in the tool.

The knife holder section further comprises a reciprocably slidable roller 29 mounted in elongated slots 31. As shown in FIG. 7, the roller 29 comprises cylindrical end portions 33 which are held in the slots 31 and a central portion 35 of a uniformly concave cross section which centers a cable riding on the roller. The slots 31, oppositely placed in the sidewalls 12, 14, each are in the form of an elongated rectangle having curved shorter ends the approximate diameter of the roller end portions 33 and having a length extending substantially the length of the knife holder section, from the forwardmost surfaces 35 of the tool to the forward edge 37 of the bottom wall 10. The slots 31 are slightly rearwardly angled away from the upper wall 16 and knife blade 22. Movement of the tool in the direction of arrow 39 in FIG. 6, relative to the cable, thereby moves the roller 29 along the slot 31 to approach the blade 22 to permit the blade to dig into the cable. The roller is preferably manufactured of one piece of molded plastic.

In an alternative embodiment, the roller may be eliminated. In this case, the width between the side walls, and, of course, their height, determines the maximum size of the cable. For most home type electrical work, the slitter should handle a cable made of 3 No. 8 wires. Smaller cables may be passed through the slitter for slitting their covers.

Figure 6:
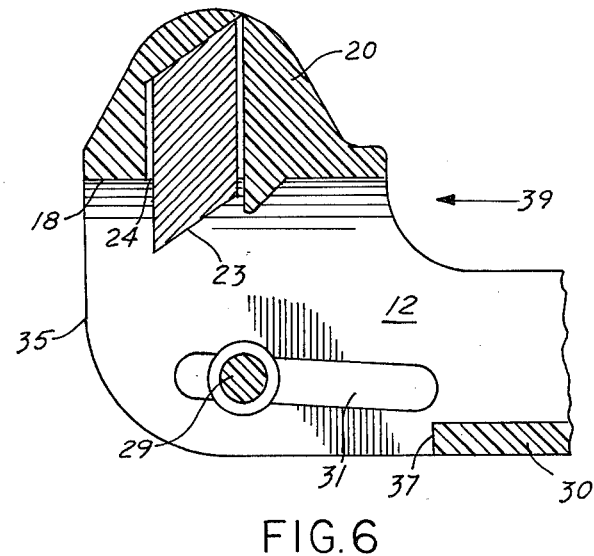
FIG. 6 is an enlarged detailed cross-sectional view of the knife holding section of the tool according to the invention.

The cable guide section is integrally formed with the slitting section, and it includes extensions of the sidewalls 12 and 14, and a connecting bottom 30, FIG. 6. The bottom wall 30 extends generally planar along the length of the guide section and then angles upwardly, forming wall section 32 extending above the sidewalls. A cable entering the tool moves along the bottom wall 30, then moves up the angled wall 32, either by bending the cable or tilting the tool. The tool is tilted to force the blade into the cable covering as the cable is withdrawn from the tool.

The handle section is integral with the guide section including a pair of curved flanges 34 and 36, which are integral with a web 38. A trigger shaped finger rest 40, having a reinforcing web 41, depends downwardly from the handle near its upper end. An extending flange 44 with an aperture 46 provides means for attaching a chain or cord to the tool, for hanging it from the worker's clothing in position for fast retrieval.

The tool is effectively injection molded as a single unit, including the three sections as an integral tool. It may be molded of an inexpensive plastic or polymer when then manufactured by injection molding. The roller 29 is inserted through the open bottom portion by spreading the side walls 12, 14. The tool is an inexpensive item and it may be thrown away when the knife dulls. Such polymers as ABS, acrylics, nylon, phenolics, polyesters, etc. may be used in an injection molding manufacturing. The molding produces the integral plastic portions of the tool, with the knife being inserted after the withdrawal of the plastic tool from the mold.

The knife blade is inexpensive so the total tool is a highly usable, inexpensive tool.

The tool is used by telescoping it over an electric cable by passing the cable through a forward aperture 47 between the roller 29 and the knife blade 22. The cable is passed from the knife section, so that it passes rearwardly into the guide and release section. The cable end passes up the wall 32, out the open rear portion 49 of the tool. The cable covering is slit by tilting the tool to force the knife into the top of cable covering, with the roller 29 impinging on the bottom of the cable. As the tool is pulled, the roller 29 moves in the slot 31 due to frictional engagement with the roller, and the knife 22 penetrates the cable covering, whereupon the roller rotates to facilitate slitting. The tool is withdrawn from the cable while tilted, to slit the cable cover. For protruding cable ends, the tool may be passed over the cable up to the wall from which the cable protrudes. This permits slitting the cover up to a fraction of an inch from the wall. The slit cover is now ready to be cut off and the ends of the wires bared for connection with terminals.

What is claimed is:

1. An electric cable cover slitter tool, comprising:
   (a) a pair of spaced apart walls,
   (b) a short top wall, less than the length of said pair of spaced apart walls, joining said spaced apart walls at the front portion thereof and having an open rear portion,
   (c) a bottom wall joining said spaced apart walls from a point adjacent to and spaced rearwardly from said short top wall, leaving an opening for cables and terminating in a wall section angled from the plane of said bottom wall forming a cable release,
   (d) handle means depending from said pair of spaced apart walls,
   (e) knife means secured in said short top wall in position to slit a cable covering passing between said spaced apart walls, and
   (f) roller means extending between said spaced apart walls, opposite said knife means, for holding said cable against said knife means during slitting.

2. An electric cable cover slitter tool according to claim 1, further comprising:
   elongated slot means for reciprocably, rotatably supporting said roller means, said slot means having a length angled towards said knife means so that said roller means may move in said slot means towards said knife means with cable movement through said tool.

* * * * *